Sept. 24, 1957  J. M. NAUL  2,807,735
SHADED POLE MOTOR

Filed May 1, 1956  3 Sheets-Sheet 1

INVENTOR.
JAMES M. NAUL
BY James and Franklin
ATTORNEYS.

Sept. 24, 1957 J. M. NAUL 2,807,735
SHADED POLE MOTOR
Filed May 1, 1956 3 Sheets-Sheet 2

INVENTOR.
JAMES M. NAUL
BY
James and Franklin
ATTORNEYS.

Sept. 24, 1957  J. M. NAUL  2,807,735
SHADED POLE MOTOR
Filed May 1, 1956  3 Sheets-Sheet 3
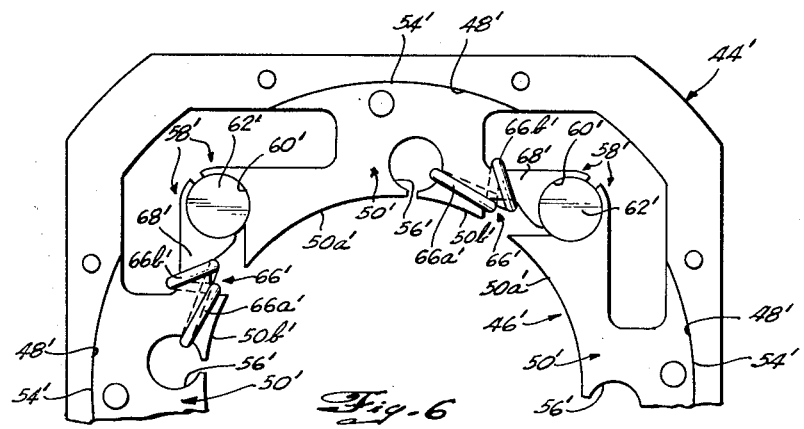
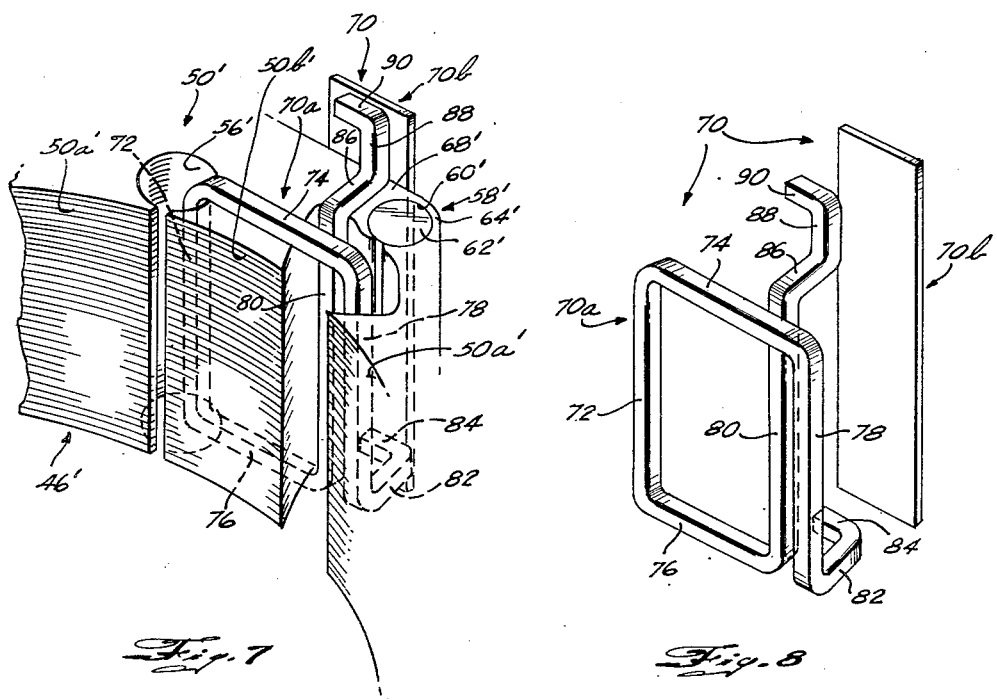
INVENTOR
JAMES M. NAUL
BY
James and Franklin
ATTORNEYS.

10

United States Patent Office 2,807,735
Patented Sept. 24, 1957

2,807,735

SHADED POLE MOTOR

James M. Naul, Plainfield, N. J., assignor to Eastern Air Devices, Inc., Dover, N. H., a corporation of New York Application May 1, 1956, Serial No. 581,993

25 Claims. (Cl. 310—172)

The present invention relates to the construction of a stator for an electric motor, and more particularly to such a stator construction which facilitates the starting of the rotor in an induction motor.

In induction motors, the stators are provided with pole pieces energized so as to produce an alternating flux, the rotor positioned between the pole pieces having a magnetic status induced therein which tends to follow the resultant flux produced by the energization of the stator, that resultant flux rotating about the axis of the motor. Once the rotor is rotating, it experiences little difficulty in following the movement of the resultant stator flux, but the rotor will not, unaided, commence rotation. Several expedients have been resorted to in order to provide such a motor with a self-starting characteristic. Special pole face shapings, providing for an unusual flux distribution between stator and rotor, have been tried. They have not proven satisfactory, to a large extent because they adversely affect the normal running characteristics of the motor. One of the methods of achieving a self-starting effect is by using so-called shaded poles, the pole pieces of the stator being divided into two sections and a short circuited conductive coil surrounding one of those sections. The electromagnetic interaction between the short-circuited or shading coil and the alternating flux induced in the pole piece by the energizing coil causes the flux in the shaded pole section to lag behind the flux in the unshaded pole section. The flux distribution thus produced causes the rotor to commence rotation without having to apply any mechanical force thereto.

Shaded poles have been adopted on a wide scale because of their simplicity, reliability and low cost, but they have never been considered as the ultimate in arrangements to produce starting torque, particularly because of the fact that the amount of starting torque which they can produce is limited.

In my Patent 2,709,762 of May 31, 1955, entitled "Electric Motor Stator Construction," I disclose the use of poles formed in two portions each of material having different hysteresis characteristics, the pole portion having the greater magnetic hysteresis characteristic producing a flux operative on the rotor which lags behind the flux produced by the other pole portion, the pole portion having the greater magnetic hysteresis characteristic optionally being provided with a shading coil of conventional form in order to accentuate the phase lag between its flux and that produced by the other pole portion.

While that construction is effective to achieve the desired results, the low permeability of the material which made up the pole piece portion having the greater hysteresis characteristic, and the necessary existence of an air gap between that pole piece portion and the rotor, greatly minimized the magnitude of the lagging flux active on the rotor. The starting torque, however, is at least roughly proportional not only to the phase difference between the fluxes in the main and shaded pole portions, but also to the magnitudes of those fluxes.

In addition, the non-uniform nature of the pole pieces and the multiplicity of pieces to be handled and fitted together produced somewhat troublesome assembly problems and resulted in a stator the various parts of which were not retained in position to an optimum degree.

In accordance with the present invention, and as in my previous patent, the stator comprises materials having different hysteresis characteristics, the material of greater hysteresis characteristic being relied upon to produce a lagging flux. However, the present invention is characterized by having the main and auxiliary pole portions formed of the same material, preferably of low hysteresis and high permeability characteristics, thus permitting the use of laminations essentially more conventional in nature and facilitating assembly of the various parts of the stator. These pole portions collectively define part of a main or conventional magnetic path from one pole to another through the rotor and across the air gaps between the poles and the rotor. The material of higher hysteresis characteristic, and usually of comparatively low permeability, defines at least a part of an auxiliary magnetic path independent of the main or conventional magnetic path, connected in parallel therewith and preferably substantially devoid of air gaps. Accordingly a given energization of the stator as a whole will produce, in the material of greater hysteresis characteristic, a substantially increased amount of lagging flux than was produced in the structure of my Patent 2,709,762, despite the comparatively low permeability of that material. Means are provided for linking this lagging flux with the flux in an auxiliary or shaded pole portion so that the phase of the flux in that shaded pole portion will correspond more or less closely to the phase of the flux in the material of high hysteresis characteristics. Hence the phase difference between the flux in the main and shaded pole portions is increased over what would be the case if only a shaded pole were employed, and at the same time the magnitude of the flux in the shaded pole portion is maximized. As a result the starting torque of the motor is significantly increased, and the running characteristics thereof are quite favorable.

The hysteresis phenomenon is one which is well recognized in the field of magnetism. It relates to the fact that the flux through a section of magnetizable material often depends not only upon the magnitude of the energizing force applied thereto but also upon the previous magnetic history of the material. Different materials will exhibit different hysteresis characteristics, and consequently the same energizing force applied to such different materials may result in different magnetic fluxes passing therethrough. Moreover, when an alternating or cyclically varying energizing force is applied to a material having a particular hysteresis characteristic the magnitude of the flux passing therethrough at any given moment will vary not only according to the energizing force but also according to the hysteresis characteristic, and a substance having a more marked hysteresis characteristic will, during the variation of the energizing force, carry a flux which, at any given instant, is somewhat less than the flux through the first mentioned material. Thus hysteresis may be considered as a sort of magnetic viscosity.

To the accomplishment of the above, and to such other objects as may hereinafter appear, the present invention relates to the structure of a shaded pole induction motor as defined in the appended claims and as described in this specification, taken together with the accompanying drawings, in which:

Fig. 6 is a fragmentary view similar to Fig. 5 but illustrating a modification thereof;

Fig. 7 is a three-quarter perspective view, on an enlarged scale, showing the stator of Fig. 5 and a two-piece pre-formed figure-eight coil; and Fig. 8 is a three-quarter perspective exploded view of the preformed parts of the figure-eight coil of Fig. 7.

Figure 1:
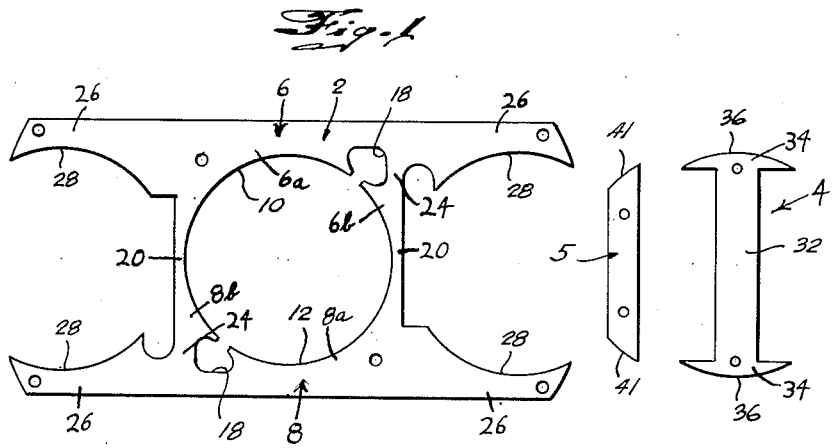
Fig. 1 is an exploded view of the several types of laminations which might be employed in forming a two-pole motor in accordance with the present invention.
Figure 2:
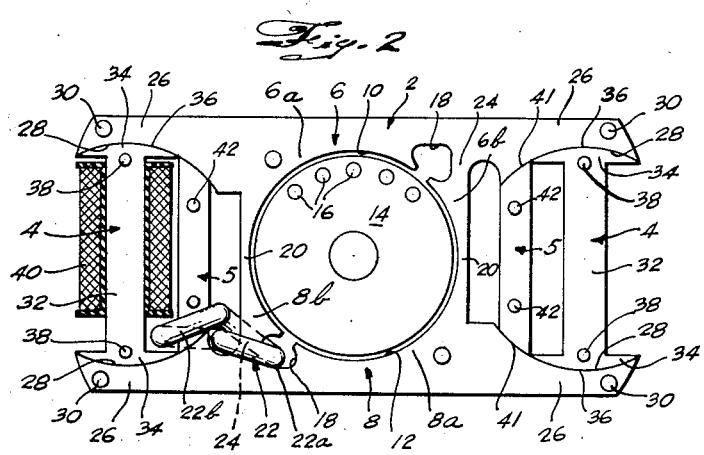
Fig. 2 is a front elevational view of the stator of such a two-pole motor with the rotor shown in operative position.
Figure 3:
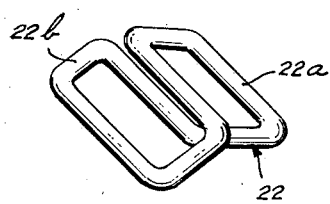
Fig. 3 is a three-quarter perspective view of the figure-eight coil which links the shaded pole portions and the auxiliary magnetic structurse associated therewith.

Figs. 1, 2 and 3 illustrate the present invention as embodied in a two-pole squirrel cage type induction motor. The stator, as is conventional, is built up from a plurality of stamped laminations, the laminations of each type being stacked to desired depth or thickness and then secured together. In the form here specifically disclosed three different types of laminations are employed, designated respectively 2, 4, and 5. The laminations 2 define the poles generally designated 6 and 8 having pole faces 10 and 12 respectively within which the squirrel cage rotor, generally designated 14, is rotatably mounted, this rotor being provided, as is conventional, with longitudinally extending conductors 16 the ends of which are electrically connected together. Slots 18 extend inwardly from the pole faces 10 and 12 respectively, and the poles 6 and 8 are bridged by integral lamination portions 20. Shading coils generally designated 22 are adapted to be received within the slots 18 and to encompass the lamination necks 24, so that each pole 6 and 8 is divided thereby into a main pole portion 6a, 8a respectively and a shaded pole portion 6b, 8b respectively, each shaded pole portion 6b and 8b being respectively interposed between its own main pole portion 6a or 8a respectively and the main pole portion 8a and 6a respectively of the adjacent pole.

The lamination 2 further comprises laterally extending wings 26 arranged in opposed pairs and provided with arcuate inner surfaces 28. The laminations 2, after being stacked one upon the other to appropriate depth, are secured together by means of rivets 30 or the like.

The laminations 4 comprise a shank 32 carrying heads 34 at each end thereof, those heads having outer arcuate surfaces 36 corresponding to the arcuate inner surfaces 28 of the wings 26 of the laminations 2. The individual laminations 4 are stacked one upon the other to desired depth and the stacks are then secured together by means of rivets 38 or the like. Thereafter a coil 40 is wound around each shank 4 and the thus defined assembly is inserted in place between a given opposed pair of wings 26, the size of the laminations 4 preferably being such that a press or comparable fit results although, of course, any suitable means could be provided for retaining that assembly in place on the laminations 2. As will be apparent from Figs. 1 and 2, two sets of laminations 4 with associated coils 40 are provided.

The laminations 2 and 4 may be formed of the same material, and preferably that type of comparatively low hysteresis material which is conventional in the formation of induction motor laminations. The laminations 5, however, are formed of material having a different hysteresis characteristic from the material of the laminations 2 and 4, and preferably a material characterized by having a much larger hysteresis loop than the material of the laminations 2 and 4. For example, the laminations 2 and 4 may be formed of mill annealed electric sheet steel, dynamo weight, such as is conventional for machines of this type, whereas the laminations 5 may be formed of tungsten sheet steel having a composition of 5% tungsten, 1% carbon and the balance iron. By using these materials, which are merely exemplary of innumerable other types of magnetizable materials which might be employed, the lamination 4 will have a more marked magnetic hysteresis characteristic than the laminations 2 and 4.

The laminations 5 are here disclosed as being in strip form with curved outer edges 41 the curvature of which corresponds to the inner surfaces 28 of the wings 26 of the laminations 2. The laminations 5 are stacked upon one another to desired depth, are secured together by means of rivets 42 or the like, and are then inserted between an opposed pair of wings 26 inside the stack of laminations 4 as shown in Fig. 2. Preferably the length of the laminations 5 is such that they are a press or comparable fit between the wings 26, but of course any appropriate means could be provided for retaining them in place.

The shading coil 22 as here specifically disclosed is of figure-eight configuration, as may best be seen from Fig. 3. One loop 22a thereof encompasses the lamination neck 24 and the other loop 22b thereof encompasses the adjacent stack of laminations 5.

It will be apparent from an examination of Fig. 2 that two magnetic paths are defined through which the flux produced from each of the coils 40 passes. The main magnetic path, which is more or less conventional in structures of this type, extends from the shank 32 of the lamination 4 through the upper wing 26 of the lamination 2 to the pole 6, there dividing between the main pole portion 6a and the shaded pole portion 6b, crossing the air gap to the rotor 14, passing through the rotor 14, crossing the air gap to the main and shaded pole portions 8a and 8b respectively, continuing through the lamination 2 to the lower wing 26 and then extending up into the shank 32 of the laminations 4. In addition, an auxiliary magnetic path is produced from the upper wing 26 through the laminations 5 to the lower wing 26. This auxiliary magnetic path, it will be seen, is in parallel with that portion of the main magnetic path which passes through the poles 6 and 8 and the rotor 14. It should further be noted that the auxiliary magnetic path is defined in substantial part by the material of the laminations 5, which has substantially greater hysteresis characteristic than the material of the other laminations. It is also worthy of note that this auxiliary magnetic path has no air gaps.

As a result of the difference in magnetic characteristics as between the materials defining the main magnetic path and the material comprising the auxiliary magnetic path, the flux in the auxiliary magnetic path, that is to say, the flux through the laminations 5, will lag appreciably behind the flux passing through the main pole portions 6a and 8a. Because of the existence of the shading coils 22, the flux in the shaded pole portions 6b and 8b will tend to lag behind the flux in the main pole portions 6a and 8a. Furthermore, because the shading coils 22 are of figure-eight configuration and link the shaded pole portions 6b and 8b respectively with adjacent laminations 5 defining portions of the auxiliary magnetic paths, the flux lagging tendencies of the shading coils 22 themselves and of the material of high hysteresis characteristic which form the laminations 5 will work together to accentuate the phase difference between the flux in the shaded pole portions 6b and 8b and the flux in the main pole portions 6a and 8a. The figure-eight coils 22 will cause the phase of the flux in the shaded pole portions 6b and 8b and the phase of the flux in the laminations 5 to be the same.

Because there are no air gaps in the auxiliary magnetic paths a substantial proportion of the total flux emanating from the coils 40 will pass therethrough, and therefore the high hysteresis material will have a greater effect on the flux lag as between the path and shaded pole portions than would otherwise be the case. Furthermore, the actual flux passing through the shaded pole portions 6b and 8b will be appreciable since they will be formed of comparatively high permeable material.

It will be appreciated that the relationships between the magnitudes of flux in the main and auxiliary magnetic paths and the distribution of pole flux as between main and shaded pole portions can be varied by appropriate lamination design in accordance with the known principles, the permeability of the materials and the cross sectional areas of the narrowest portions of each of the paths being inter-related to produce the desired results. One particularly desirable relationship, it is believed, is for the fluxes in the main and auxiliary magnetic paths to be related in the same ratio as the pole face areas of the main pole portions 6a, 6b and the shaded pole portions 8a and 8b respectively are related. It should be borne in mind that flux diverted from the main magnetic path to the auxiliary magnetic path is lost to the main pole portions 6a and 6b, but is not lost to the shaded pole portions 6b and 8b, since the figure-eight coils 22 will effectively transfer flux from the laminations 6 to the shaded pole portions 6b and 8b respectively in order that the fluxes in the shaded pole portions and the laminations 6 will be equal not only as to phase but also as to magnitude.

Figure 4:
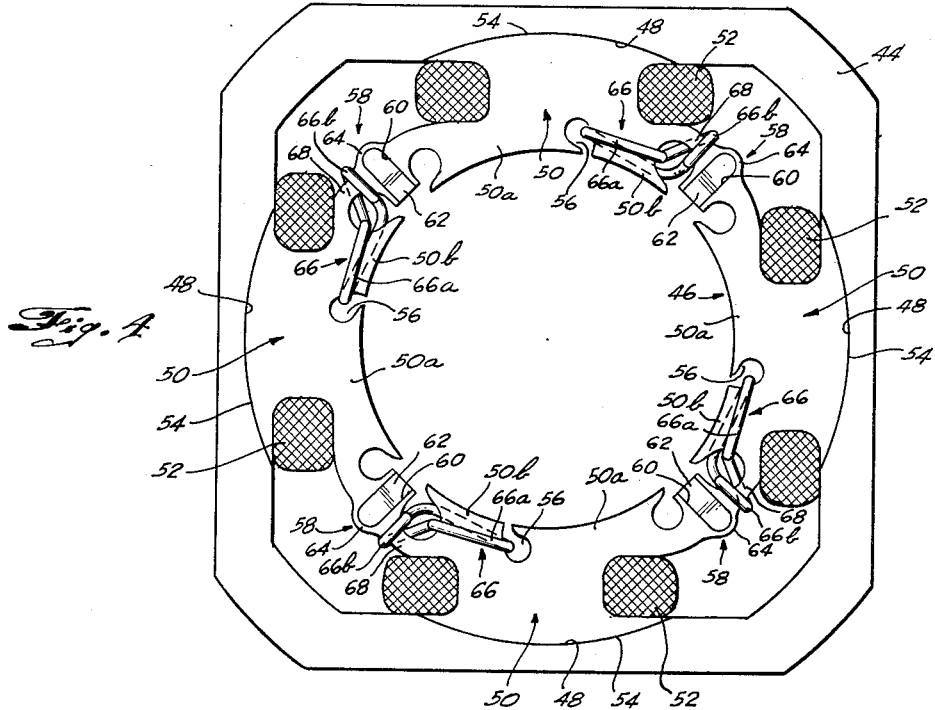
Fig. 4 is a front elevational view of a stator construction for a four-pole induction motor in accordance with the present invention.

Fig. 4 discloses a lamination design for a four-pole induction motor in accordance with the present invention. The laminations comprise an outer ring 44 and an inner spider generally designated 46. The ring 44 is provided with concave portions 48. The spider 46 comprises a plurality of poles 50 around which coils 52 are wound, those poles 50 having heads with surfaces 54 corresponding to the surfaces 48. The poles 50 are divided into main pole portions 50a and shaded pole portions 50b by means of slot 56. Adjacent poles are connected by bridges 58 integral therewith, the spider 46 therefore being in one piece. The bridges 58 are provided with radially outwardly extending slots 60 within which high hysteresis material 62 in the form of bars or laminations are received and retained in any appropriate manner. Only a thin neck 64 of low hysteresis material remains in the spider 46 at the radially outer ends of the slots 60, this neck 64 readily becoming magnetically saturated. Figure-eight coils 66 have loops 66a which encompass the shaded pole portions 50b and have loops 66b which encompass neck portions 68 of the spider 46 between the high hysteresis material 62 and the corresponding pole portions 50b.

In this construction the main magnetic path may be traced up through a pole 50, along the ring 44 to and down through the next adjacent pole 50, dividing as between the main and shaded pole portions 50a and 50b respectively, across the air gap into the rotor, through the rotor, and across the air gap between the rotor and the first mentioned pole 50 and up through that pole. This is the conventional magnetic path for machines of this type, and the material of which the ring 44 and spider 46 is formed is also conventional, similarly to the laminations 2 and 4 in the preceding embodiment. The auxiliary magnetic path extends between the main pole portion 50a of one pole 50 and the shaded pole portion 50b of the next adjacent pole 50. That auxiliary path is defined in substantial part by the material 62 of high hysteresis characteristic, and consequently the flux in this auxiliary magnetic path will lag behind the flux in the main magnetic path. The figure-eight windings 66 function in the same manner as the windings 22 in the embodiment of Figs. 1–3. The fact that the loops 66b do not directly encompass the material 62 of high hysteresis characteristic is not material, since the flux in the neck portions 68 encompassed thereby will be in phase with the flux through the high hysteresis material 62. The existence of a narrow web of low hysteresis material 64 in parallel with the high hysteresis material 62 will have no significant effect on the functioning of the motor, since that narrow web will readily saturate and hence will not permit any appreciable amount of flux to pass therethrough. The presence of the web 64 is desired to facilitate assembly, since it is by means of that web that the several poles 50 are connected together to form a single unitary spider 46. However, when assembly problems are not a factor the webs 64 could be eliminated (see Fig. 6) or, alternatively, they could be removed after assembly.

Figure 5:
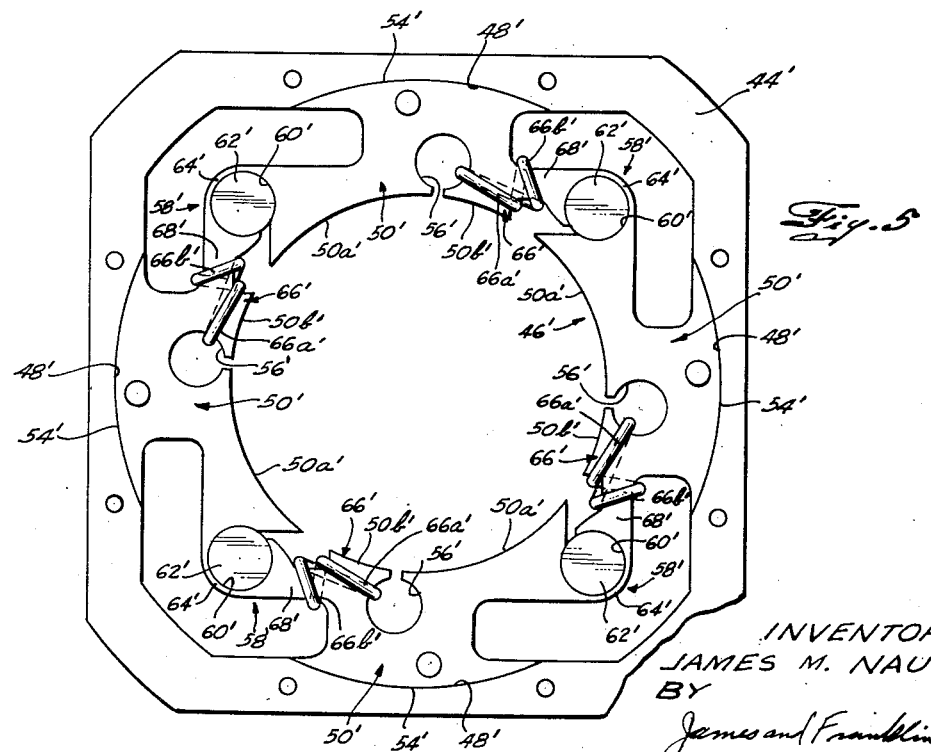
Fig. 5 is a view similar to Fig. 4 but showing still another form of stator design.

The embodiment of Fig. 5 is essentially similar to that of Fig. 4 except that a specifically different lamination design is there disclosed which is in some respects somewhat simpler than that of Fig. 4 to produce. The parts of the embodiment of Fig. 5 are numbered similarly to the corresponding parts of the embodiment of Fig. 4, but are differentiated by being primed.

Fig. 6 discloses the embodiment of Fig. 5 with the necks 64' removed so that all the flux which passes through the auxiliary magnetic path must pass through the material 62' of high hysteresis characteristic. As has been previously stated, the modification could be carried out with respect to the embodiment of Fig. 4. In this modification the spider 46' will no longer be unitary, but will be in as many pieces as there are poles 50'. The bodies 62' of high hysteresis material will wedge the individual spider pieces in position.

Figs. 7 and 8 disclose, in conjunction specifically with the lamination design of Figs. 5 and 6, a preformed two-piece type of figure-eight winding, generally designated 70. It is formed in two pieces 70a and 70b. The piece 70a comprises a preformed bent strip of conductive material having a length 72 adapted to be received in the slot 56', lengths 74 and 76 connected thereto and adapted to extend respectively over the upper and lower ends of the shaded pole portion 50b', lengths 78 and 80 extending respectively down from the length 74 and up from the length 76, both of the lengths 78 and 80 being adapted to be received radially inside the neck 68' and to be separated from one another. A length 82 extends outwardly from the bottom of the length 78 so as to extend along the underside of the neck 68' and substantially up to the radially outer surface thereof, and is there provided with a laterally extending length 84. A length 86 extends outwardly from the upper end of the length 80 so as to be received over the top of the neck 68 and extend substantially up to the radially outer surface thereof, and is there provided with an upwardly extending length 88 and a laterally extending length 90. The part 70b is formed of similar conductive material to the part 70a but is disclosed as planar and is here shown in strip form. The part 70a may be inserted into the slot 56 and alongside the neck 68 from the inside of the spider 46'. The part 70b is then positioned so as to engage the lengths 84, 88 and 90, to which it may be secured in any appropriate manner, as by silver solder. Through the use of the two-piece preformed figure-eight winding 70 assembly is greatly facilitated and the bending and connecting of the conductors which define the coils 22, 66 or 66' is eliminated.

In all of the disclosed embodiments the main and shaded pole portions are formed integrally with one another and of the same comparatively low hysteresis material. The main magnetic path is essentially conventional. The auxiliary magnetic path of high hysteresis material which produces the lagging flux component is defined in a simple way and without interfering appreciably with the normal geometry or design of the main magnetic path. Nevertheless, by being linked with the flux passing through the shaded pole portions, the auxiliary magnetic path produces in that shaded pole flux a greater degree of lag relative to the flux in the main pole portions than would otherwise be the case. Moreover, since the auxiliary magnetic path has no air gaps, the energization thereof is effective to a maximum degree to produce lagging flux, since none of that energization is wasted in overcoming the magnetic resistance of air gaps or the like. In addition, since the shaded pole portions are formed of material which is usually of high permeability, whereas the high hysteresis material is usually of low permeability, the amount of flux passing through the shaded pole portions and hence effective to produce a starting torque is greatly maximized over prior art arrangements.

While but a few specific lamination designs are here disclosed, it will be apparent that these are but typical and, indeed, that other types of lamination arrangements such as those in which the poles are integral with the outer rings, could also be employed, and that many other variations could be made in the specific details here disclosed without departing from the spirit of the invention as defined in the following claims.

I claim:

1. A shaded pole induction motor comprising a rotor, a stator comprising a plurality of poles each divided into main and shaded pole portions, energizing coils, main magnetic structure formed of magnetizable material characterized by a given hysteresis characteristic linking said coils and said pole portions so that the latter are energized by said coils, a main magnetic path being defined thereby at least in part and extending from said coils through said poles and rotor and back to said coils, and auxiliary magnetic structure comprising magnetizable material characterized by having a hysteresis characteristic different from that of said main magnetic structure and defining an auxiliary magnetic path in parallel with said main magnetic path, and means operative between said auxiliary magnetic path and the shaded pole portion in parallel therewith effective to link the magnetic fluxes therein.

2. A shaded pole induction motor comprising a rotor, a stator comprising a plurality of poles each divided into main and shaded pole portions, energizing coils, main magnetic structure formed of magnetizable material characterized by a given hysteresis characteristic linking said coils and said pole portions so that the latter are energized by said coils, a main magnetic path being defined thereby at least in part and extending from said coils through said poles and rotor and back to said coils, and auxiliary magnetic structure comprising magnetizable material characterized by having a larger hysteresis loop than said main magnetic structure and defining an auxiliary magnetic path in parallel with said main magnetic path, and means operative between said auxiliary magnetic path and the shaded pole portion in parallel therewith effective to link the magnetic fluxes therein.

3. A shaded pole induction motor comprising a rotor, a stator comprising a plurality of poles each divided into main and shaded pole portions, energizing coils, main magnetic structure formed of magnetizable material characterized by a given hysteresis characteristic linking said coils and said pole portions so that the latter are energized by said coils, a main magnetic path being defined thereby at least in part and extending from said coils through said poles and rotor and back to said coils, and auxiliary magnetic structure comprising magnetizable material characterized by having a hysteresis characteristic different from that of said main magnetic structure and defining an auxiliary magnetic path between adjacent poles which is substantially free of air gaps, and means operative between said auxiliary magnetic path and the shaded pole portion in parallel therewith effective to link the magnetic fluxes therein.

4. A shaded pole induction motor comprising a rotor, a stator comprising a plurality of poles each divided into main and shaded pole portions, energizing coils, main magnetic structure formed of magnetizable material characterized by a given hysteresis characteristic linking said coils and said pole portions so that the latter are energized by said coils, a main magnetic path being defined thereby at least in part and extending from said coils through said poles and rotor and back to said coils, and auxiliary magnetic structure comprising magnetizable material characterized by having a larger hysteresis loop than said main magnetic structure and defining an auxiliary magnetic path between adjacent poles which is substantially free of air gaps, and means operative between said auxiliary magnetic path and the shaded pole portion in parallel therewith effective to link the magnetic fluxes therein.

5. A shaded pole induction motor comprising a rotor, a stator comprising a plurality of poles each divided into main and shaded pole portions, energizing coils, main magnetic structure formed of magnetizable material characterized by a given hysteresis characteristic linking said coils and said pole portions so that the latter are energized by said coils, a main magnetic path being defined thereby at least in part and extending from said coils through said poles and rotor and back to said coils, and auxiliary magnetic structure comprising magnetizable material characterized by having a hysteresis characteristic different from that of said main magnetic structure and defining an auxiliary magnetic path in parallel with said main magnetic path, extending between the shaded pole portion of one pole and the main pole portion of an adjacent pole, and being substantially free of air gaps, and means operative between said auxiliary magnetic path and the shaded pole portion in parallel therewith effective to link the magnetic fluxes therein.

6. A shaded pole induction motor comprising a rotor, a stator comprising a plurality of poles each divided into main and shaded pole portions, energizing coils, main magnetic structure formed of magnetizable material characterized by a given hysteresis characteristic linking said coils and said pole portions so that the latter are energized by said coils, a main magnetic path being defined thereby at least in part and extending from said coils through said poles and rotor and back to said coils, and auxiliary magnetic structure comprising magnetizable material characterized by having a larger hysteresis loop than said main magnetic structure and defining an auxiliary magnetic path in parallel with said main magnetic path, extending between the shaded pole portion of one pole and the main pole portion of an adjacent pole, and being substantially free of air gaps, and means operative between said auxiliary magnetic path and the shaded pole portion in parallel therewith effective to link the magnetic fluxes therein.

7. The shaded pole induction motor of claim 1, in which said linking means comprises a conductive figure-eight coil surrounding a shaded pole portion and the auxiliary magnetic structure associated therewith.

8. The shaded pole induction motor of claim 2, in which said linking means comprises a conductive figure-eight coil surrounding a shaded pole portion and the auxiliary magnetic structure associated therewith.

9. The shaded pole induction motor of claim 3, in which said linking means comprises a conductive figure-eight coil surrounding a shaded pole portion and the auxiliary magnetic structure associated therewith.

10. The shaded pole induction motor of claim 4, in which said linking means comprises a conductive figure-eight coil surrounding a shaded pole portion and the auxiliary magnetic structure associated therewith.

11. The shaded pole induction motor of claim 5, in which said linking means comprises a conductive figure-eight coil surrounding a shaded pole portion and the auxiliary magnetic structure associated therewith.

12. The shaded pole induction motor of claim 6, in which said linking means comprises a conductive figure-eight coil surrounding a shaded pole portion and the auxiliary magnetic structure associated therewith.

13. The shaded pole induction motor of claim 1, in which the sizes and magnetic characteristics of said main and auxiliary magnetic structures are so related that the total flux produced by said coils divides as between said main and auxiliary magnetic paths in substantially the same proportion as the relative face areas of said main and shaded pole portions respectively.

14. The shaded pole induction motor of claim 2, in which the sizes and magnetic characteristics of said main and auxiliary magnetic structures are so related that the total flux produced by said coils divides as between said main and auxiliary magnetic paths in substantially the same proportion as the relative face areas of said main and shaded pole portions respectively.

15. The shaded pole induction motor of claim 3, in which the sizes and magnetic characteristics of said main and auxiliary magnetic structures are so related that the total flux produced by said coils divides as between said main and auxiliary magnetic paths in substantially the same proportion as the relative face areas of said main and shaded pole portions respectively.

16. The shaded pole induction motor of claim 4, in which the sizes and magnetic characteristics of said main and auxiliary magnetic structures are so related that the total flux produced by said coils divides as between said main and auxiliary magnetic paths in substantially the same proportion as the relative face areas of said main and shaded pole portions respectively.

17. The shaded pole induction motor of claim 5, in which the sizes and magnetic characteristics of said main and auxiliary magnetic structures are so related that the total flux produced by said coils divides as between said main and auxiliary magnetic paths in substantially the same proportion as the relative face areas of said main and shaded pole portions respectively.

18. The shaded pole induction motor of claim 6, in which the sizes and magnetic characteristics of said main and auxiliary magnetic structures are so related that the total flux produced by said coils divides as between said main and auxiliary magnetic paths in substantially the same proportion as the relative face areas of said main and shaded pole portions respectively.

19. An induction motor comprising a rotor, a stator comprising a plurality of poles each divided into first and second portions, energizing coils, main magnetic structure formed of magnetizable material characterized by a given hysteresis characteristic linking said coils and said pole portions so that the latter are energized by said coils, a main magnetic path being defined thereby at least in part and extending from said coils through said poles and rotor and back to said coils, auxiliary magnetic structure comprising magnetizable material characterized by having a hysteresis characteristic different from that of said main magnetic structure and defining an auxiliary magnetic path in parallel with said main magnetic path, and means operative between said auxiliary magnetic path and one of said pole portions in parallel therewith for linking the magnetic fluxes therein.

20. The induction motor of claim 19, in which said linking means comprises a conductive figure-eight coil surrounding said auxiliary magnetic structure and said one of said pole portions in parallel therewith.

21. The induction motor of claim 20, in which the sizes and magnetic characteristics of said main and auxiliary magnetic structures are so related that the total flux produced by said coils divides as between said main and auxiliary magnetic paths in substantially the same proportion as the relative face areas of said main and shaded pole portions respectively.

22. The induction motor of claim 19, in which the sizes and magnetic characteristics of said main and auxiliary magnetic structures are so related that the total flux produced by said coils divides as between said main and auxiliary magnetic paths in substantially the same proportion as the relative face areas of said main and shaded pole portions respectively.

23. The induction motor of claim 19, in which the magnetic material of said auxiliary magnetic structure has a larger hysteresis loop than said main magnetic structure.

24. The induction motor of claim 19, in which said auxiliary magnetic path is substantially free of air gaps.

25. The induction motor of claim 19, in which said auxiliary magnetic path extends between said one of said pole portions of one pole and the other of said pole portions of an adjacent pole.

References Cited in the file of this patent

UNITED STATES PATENTS

| | | |
|---|---|---|
| 1,199,652 | Aron et al. | Sept. 26, 1916 |
| 1,590,025 | Hall | June 22, 1926 |
| 1,864,650 | Hansen et al. | June 28, 1932 |
| 2,019,683 | Kohlhagen | Nov. 5, 1935 |
| 2,113,693 | Junghans | Apr. 12, 1938 |